No. 679,818. Patented Aug. 6, 1901.
F. ALSIP.
PORTABLE CONSERVATORY.
(Application filed Jan. 26, 1901.)
(No Model.)
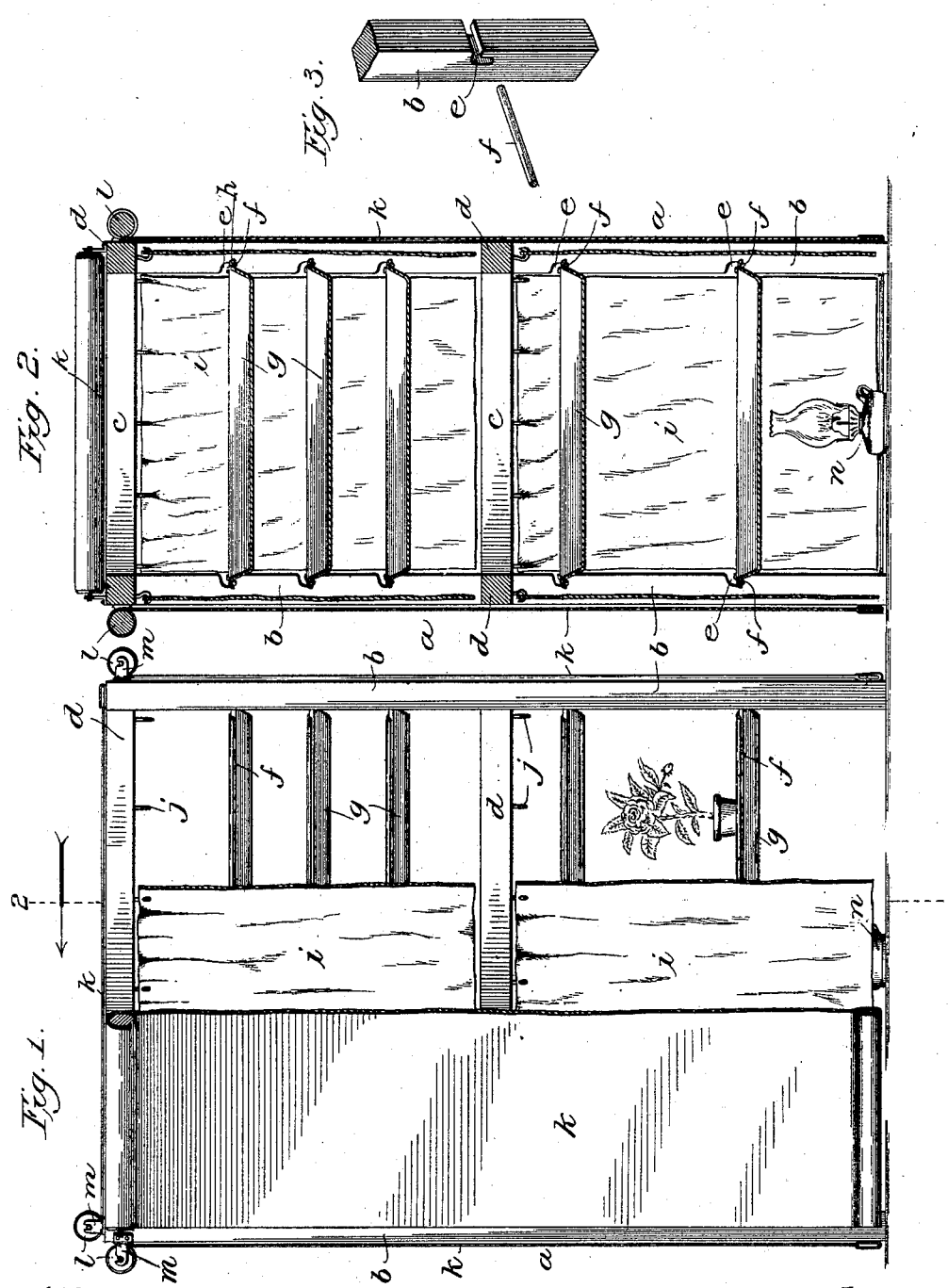

UNITED STATES PATENT OFFICE.

FRANK ALSIP, OF CHICAGO, ILLINOIS.

PORTABLE CONSERVATORY.

SPECIFICATION forming part of Letters Patent No. 679,818, dated August 6, 1901.

Application filed January 26, 1901. Serial No. 44,381. (No model.)

*To all whom it may concern:*

Be it known that I, FRANK ALSIP, a citizen of the United States, residing at Chicago, Illinois, have invented certain new and useful Improvements in Portable Conservatories for Plants, of which the following is a specification.

My invention relates particularly to conservatories which are portable and in which plants are kept.

The principal object of my invention is to provide a simple, economical, and efficient portable conservatory for plants which is adapted to be readily conveyed from place to place, either within or out of doors, means for the admission of light and heat when desired, means for regulating the temperature inside the conservatory and keeping the atmosphere of the desired degree of humidity, and means for readily inserting, adjusting, and removing the shelves and plants, all of which will more fully hereinafter appear.

The invention consists in the features, combinations, and details of construction and operation hereinafter described and claimed.

In the accompanying drawings, Figure 1 is an upright view of my improved portable conservatory with a portion of the front curtain removed; Fig. 2, an upright sectional view of the same, taken on line 2 of Fig. 1, looking in the direction of the arrow; and Fig. 3, an enlarged detail perspective view of a portion of one of the uprights, showing a portion of a shelf-supporting rod.

In constructing my improved conservatory I make a frame $a$ of the desired size, shape, and strength and preferably of wood. For this purpose I provide upright corner-posts $b$, which are firmly united by means of cross or end pieces $c$ and side pieces $d$, which extend out at right angles to each other from upright to upright and are joined firmly thereto, preferably by mortise-joints, and which, together with the uprights, form a desirable open frame. It is desirable that means be provided for holding the plants in the frame and for retaining the water which drips from the earth in which they are planted. To accomplish this, I provide slots or perforations $e$ at corresponding distances apart in each of the corner-uprights. In these slots or perforations I mount shelf-supporting rods $f$ on each side of the frame, which extend horizontally from corner to corner of the frame and parallel with each other, corresponding rods on each side being on a common level and forming what I choose to term a "pair." On each pair of rods and supported thereby is placed a concave shelf or tray $g$, on which the plants are held. These shelves, with their corresponding rods, may be raised or lowered when desired by removing the rods from the slots in which they rest and placing them in slots at other desired elevations. I prefer to make these shelves of metal, the top surface being concave or hollowed out in the form of a shallow pan or tray capable of holding water placed therein. These shelves have extensions $h$ at each end thereof, which rest upon the supporting-rods and hold the shelves in place between them.

The shelves being hollowed out in the form of a shallow pan or tray, as above stated, are provided with a desired amount of water, which is spread over a large area and being thus exposed rapidly evaporates, causing the air within the conservatory to become moist. This humidity is further increased by means of cloths $i$, which are saturated with water and hung within the frame $j$. By means of these concave shelves and saturated cloths the water contained therein is exposed to the atmosphere, which is moistened thereby, thus producing a condition of humidity within the conservatory which is very desirable for the plants. It is very desirable that the condition of humidity thus produced should be maintained when required independently of the atmospheric conditions outside the conservatory. In order to accomplish this, curtains $k$, which I make of oil-cloth or similar material, are hung at the sides, ends, and top of the frame, preferably by means of spring curtain-rolls $l$ and fixtures $m$ of the ordinary and well-known type, so that they may be readily wound and unwound as necessity may require and being unwound may entirely inclose the frame and plants for the purposes above set forth. To keep the atmosphere within the conservatory at a desired temperature and prevent the plants from freezing and also to assist in increasing the humidity of the atmosphere when desired, an ordinary oil-lamp $n$ is lighted and placed within the frame immediately beneath one of the water-containing shelves, as shown, so as to heat the water very slightly and produce a moist and warm condition of the atmosphere. The curtains are then unwound or lowered, so as to retain the heat and the dampness caused by the evaporation of the water from the shelves and damp cloths and provide atmospheric conditions such as may be considered most desirable for the plants under all circumstances.

The principal advantages of my invention are that it provides a simple, economical, and efficient conservatory for plants which is adapted to be conveniently conveyed from place to place, provides desirable means for regulating the atmospheric conditions inside the conservatory, producing a condition of humidity and darkness therein when desirable, and provides means for keeping the temperature above the freezing-point at all times and also means for readily placing and removing the plants in desired positions and for receiving the water which drains from the earth in which they are planted.

I claim—

1. In a portable conservatory, the combination with the frame of inclosing curtains, concave removable shelves mounted within the frame, removable rods upon which the shelves are mounted, and saturated cloths within the inclosure formed by the curtains, substantially as described.

2. In a portable conservatory for plants, the combination of a frame having uprights provided with slots at corresponding distances therein, removable rods resting in such slots, removable concave shelves supported upon such rods, saturated cloths hung within the frame, and curtains inclosing the frame, substantially as described.

3. In a portable conservatory for plants, the combination of a frame having uprights provided with slots at corresponding distances therein, removable rods resting in such slots, removable concave shelves supported upon such rods, saturated cloths hung within the frame, curtains inclosing the frame, and means for heating the conservatory, substantially as described.

4. In a portable conservatory for plants, the combination with the frame, of inclosing curtains at the top and all sides thereof, saturated cloths hung therein, concave movable shelves for containing water, means for heating the conservatory, and means for winding and unwinding the curtains, whereby the atmospheric conditions may be regulated as required substantially as described.

5. In a portable conservatory for plants, the combination with the frame of inclosing curtains of oil-cloth, means for winding and unwinding the curtains, shelves mounted within the frame, and means for moistening the air within the conservatory, substantially as described.

FRANK ALSIP.

Witnesses:
THOMAS F. SHERIDAN,
HARRY IRWIN CROMER.